No. 867,224. PATENTED SEPT. 24, 1907.
M. H. NOONAN.
GARDEN IMPLEMENT.
APPLICATION FILED JUNE 6, 1906.
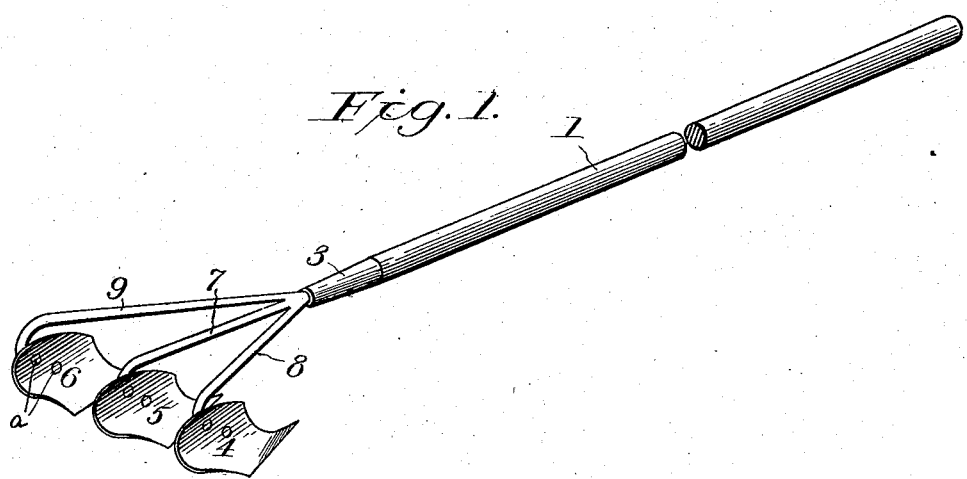
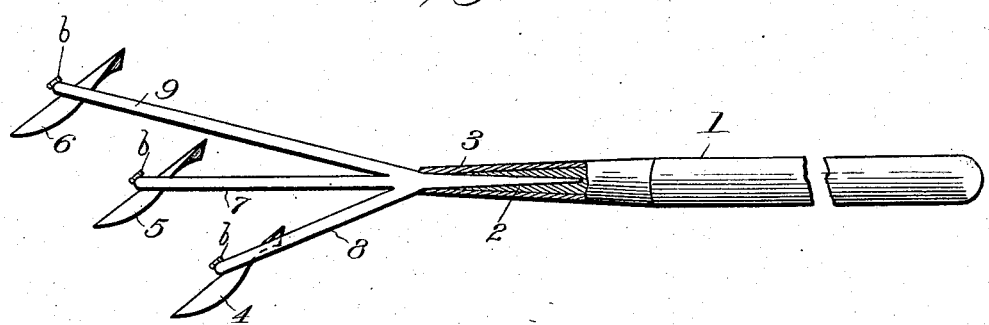
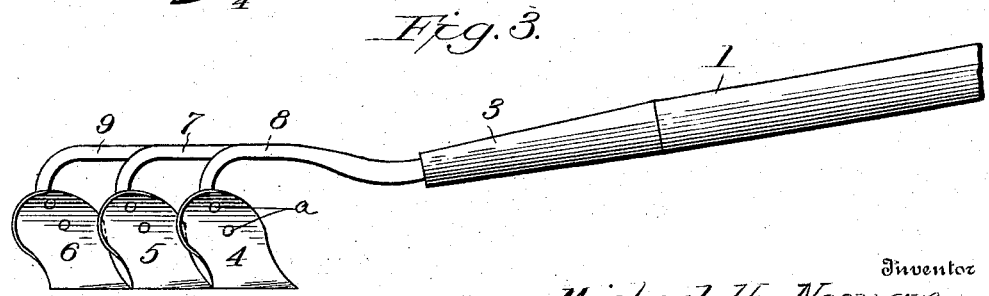
Inventor
Michael H. Noonan.
Witnesses
C. H. Walker
Wm. L. Edmiston
By Shoemaker & Brown
Attorneys

UNITED STATES PATENT OFFICE.

MICHAEL HENRY NOONAN, OF MODESTO, CALIFORNIA.

GARDEN IMPLEMENT.

No. 867,224.　　　　　Specification of Letters Patent.　　　　Patented Sept. 24, 1907.

Application filed June 6, 1906. Serial No. 320,479.

*To all whom it may concern:*

Be it known that I, MICHAEL H. NOONAN, a citizen of the United States, residing at Modesto, in the county of Stanislaus and State of California, have invented certain new and useful Improvements in Garden Implements, of which the following is a specification.

This invention relates to garden implements.

One object of the invention is to provide an exceedingly simple, inexpensive, durable and efficient implement of the character named.

Another object of the invention resides in the provision of a garden implement provided with a gang of plows arranged in advance of one another and so disposed with respect to the handle as to properly cultivate the soil by a pull upon the handle.

With the above and other objects in view, the present invention consists in the combination and arrangement of parts hereinafter referred to, shown in the accompanying drawings and pointed out in the appended claims.

In the drawings: Figure 1 is a perspective view of my invention; Fig. 2 is a top plan view partly in section; and Fig. 3 is a side elevation.

Referring now more particularly to the accompanying drawing the reference character 1 indicates a suitable handle provided at one end with a socket 2 and a ferrule 3.

The plows 4, 5 and 6 are not arranged in alinement, but preferably one in advance of another from one side of the implement to the other side thereof. For instance the plow 4 is disposed in advance of the plow 5 and the latter in advance of the plow 6, the shank 7 of the plow 5 being preferably in alinement with the longitudinal axis of the handle. The shanks 8 and 9 of the plows 4 and 6 diverge from each other. All of the shanks are of different lengths to provide for the aforesaid disposition of the plows and each plow is arranged at an angle to the longitudinal axis of the handle 1 with the inner side edges of the outer plows in alinement with the opposite side edges of the intermediate plow 5.

The shanks 7, 8 and 9 are composed preferably of spring steel and at their inner ends they are welded or otherwise formed together to form a strong end to fit in the socket 2 of the handle. In the event the plow 4 should contact with hard ground while the plows 5 and 6 were penetrating the soil the plow 4 by reason of its spring shank would yield and move upwardly and ride over the hard ground. Under such conditions either plow would ride over the hard ground without interfering with proper working of the other plows. If preferred, however, the shanks may be composed of other than yieldable material. The plows are secured to the respective shanks by two or more bolts and nuts *a* and *b*, respectively, so that they may be readily replaced in case of undue wear.

From the foregoing it will be understood that the plows are so arranged as to cut into the soil under a pulling action upon the handle, and obviously, one plow may travel in a furrow while the other plows are working the soil.

What is claimed is:—

A hand cultivator comprising a straight shank terminating at its rear end in a downwardly extending standard and at its forward end in a tapered prong, straight shanks formed with and diverging rearwardly from the sides of the first-mentioned shank intermediate the ends of the latter and terminating at their rear ends in downwardly extending standards located respectively in front and rear of the standard of the main shank, a handle into which the prong is driven for permanent engagement therein, and turning plows carried by the standards and set obliquely with their edges disposed in front to throw the soil in one direction only upon a pulling action upon the handle, all of the shanks being secured to the handles by said prong and lying in the same plane throughout their lengths.

In testimony whereof I have signed my name to this specification in the presence of two subscribing witnesses.

MICHAEL HENRY NOONAN.

Witnesses:
　J. W. ROSS,
　M. DORR.